May 26, 1964 J. PUFAHL 3,134,138
METHOD AND APPARATUS FOR FORMING PLASTIC WEBS
Filed March 22, 1962 2 Sheets-Sheet 2
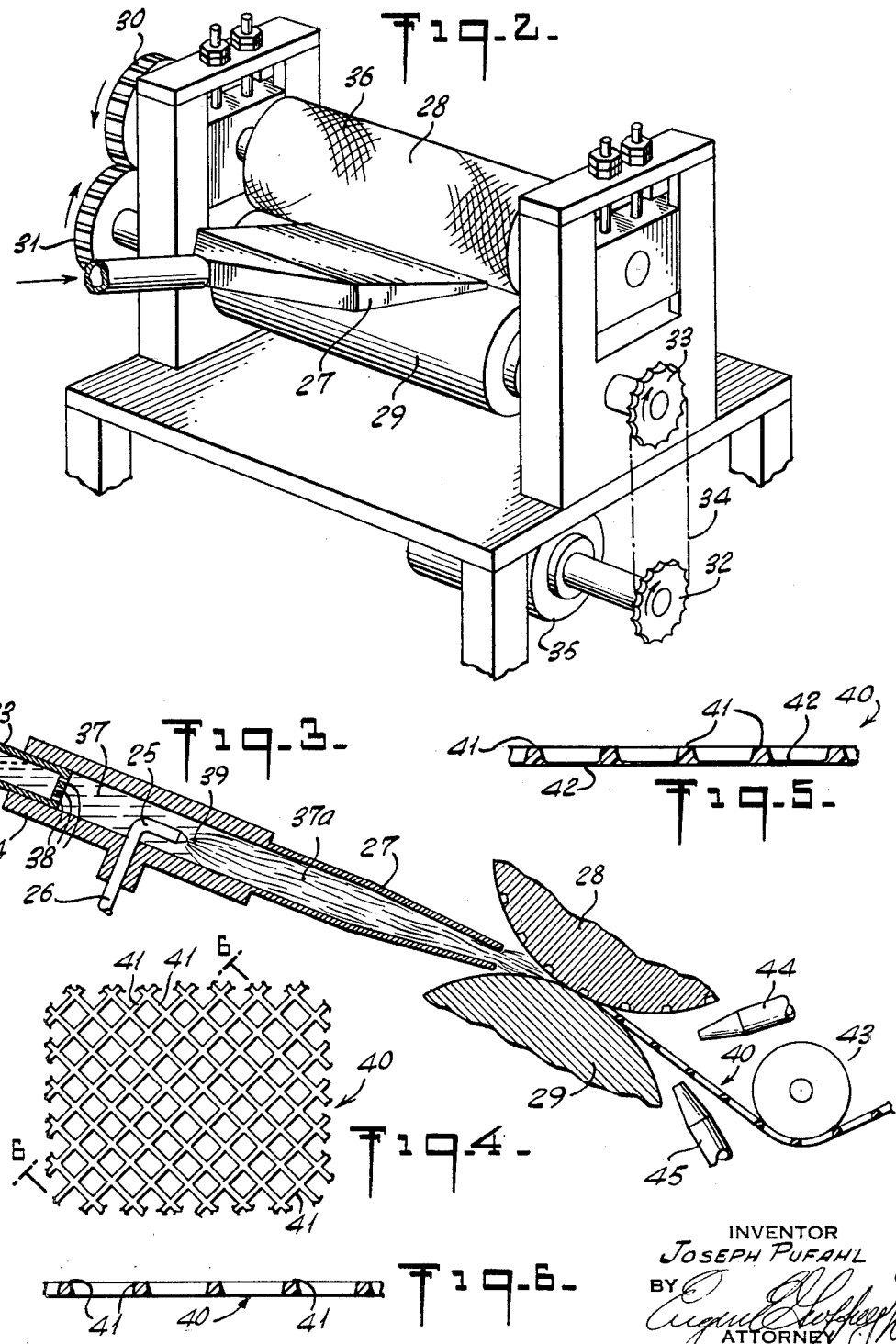
INVENTOR
JOSEPH PUFAHL 3,134,138
METHOD AND APPARATUS FOR FORMING
PLASTIC WEBS
Joseph Pufahl, 81 Gerard Ave., New Hyde Park,
Long Island, N.Y.
Filed Mar. 22, 1962, Ser. No. 181,528
18 Claims. (Cl. 18—9)

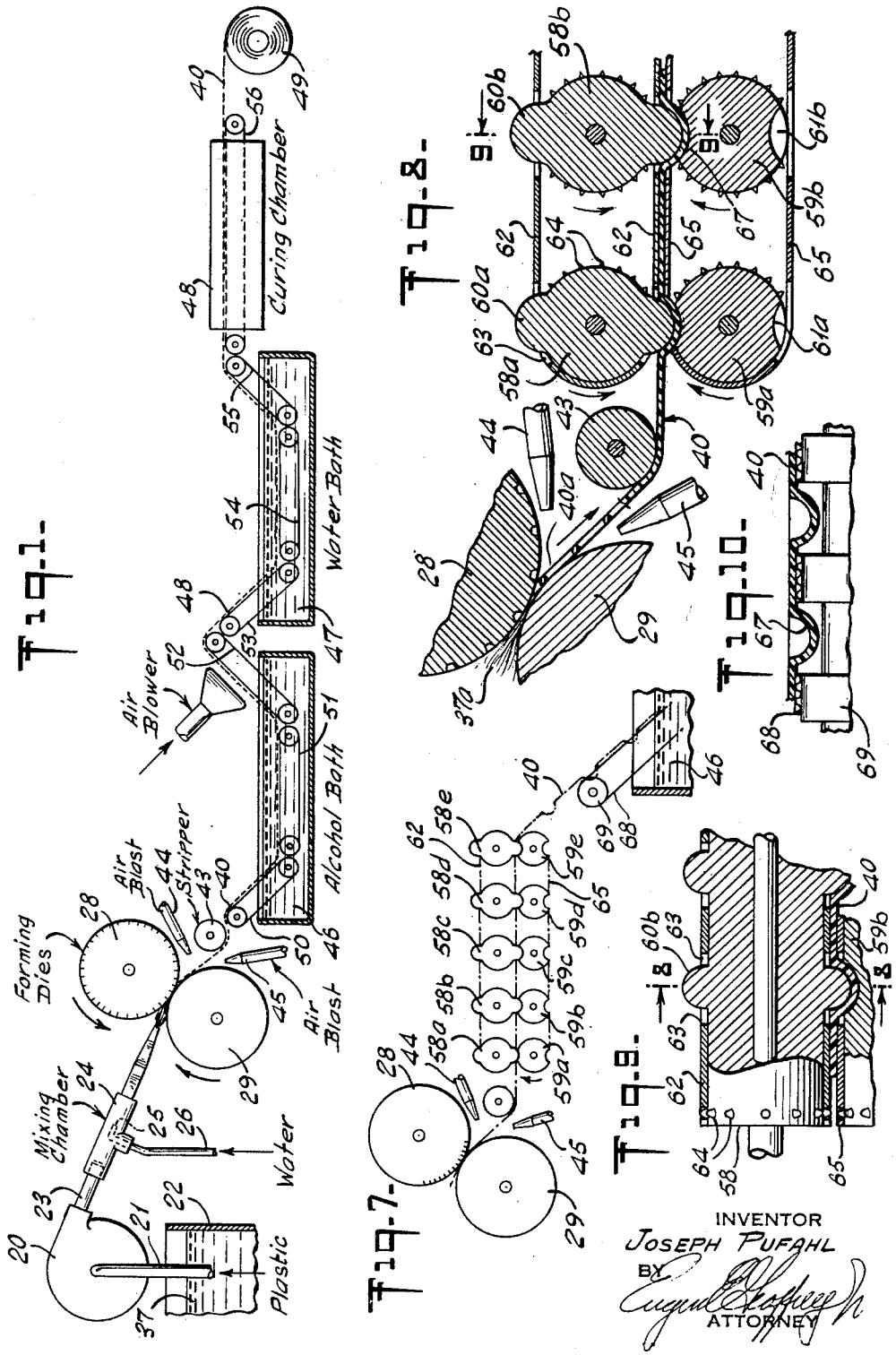

The present invention pertains to improvements in plastic-forming processes and apparatus.

In the production of plastic open-work fabrics such as netting or laces the usual practice includes the initial forming of the plastic material into fine fibres, followed by the well-known steps of spinning, weaving, etc., in substantially the same manner as applied to natural fibres. The employment of these successive mechanical processes, while necessary in such usual practice, nevertheless obviously entails a relatively high degree of operational complication with correspondingly long production time and high cost of the finished product.

An object of the present invention is to provide a continuous process by which finished meshes, laces and the like may be produced directly from a desired plastic without spinning or weaving.

A further object is to provide a continuous process of producing plastic mesh products of any desired patterns and dimensional relationships.

A further object is to provide a process of producing a patterned plastic web with a high degree of precision.

Another object is to provide a process of producing plastic web including an intermediate step of creating three-dimensional shapes from said web.

A further object is to provide suitable apparatus for carrying out the above processes.

A further object is to provide plastic mesh forming means adapted to continuous processing with maximum simplicity of operation.

A further object is to provide improved means for producing any desired perforate pattern in a plastic web.

Other objects and advantages of the invention will become evident during the course of the following description in connection with the accompanying drawings, in which FIGURE 1 is a diagrammatic longitudinal view of apparatus for carrying out the invention;

FIGURE 2 is a perspective view of the primary forming means;

FIGURE 3 is a fragmental longitudinal sectional view of the feeding and primary forming combination;

FIGURE 4 is a plan view of a typical mesh sheet produced by the device;

FIGURE 5 is an enlarged fragmental section of the product taken prior to removal of the base film;

FIGURE 6 is a similar view taken after removal of the film;

FIGURE 7 illustrates a modification of the apparatus adapted to produce forms such as cups from the moving plastic web;

FIGURE 8 is an enlarged fragmental longitudinal section of the same;

FIGURE 9 is an enlarged fragmental cross-section in the plane 9—9, FIG. 8, and

FIGURE 10 is an enlarged detail section of the embossed web and supporting means therefor.

Referring to FIG. 1, the numeral 20 indicates a liquid pump adapted to receive a plastic solution via a suction pipe 21 from a reservoir 22, and to discharge the fluid through an outlet pipe 23 to an elongated mixing chamber 24. A mixing nozzle 25, concentrically disposed in the chamber 24 and directed toward the outlet thereof, is provided with an exterior supply pipe or tube 26. Connected to the outlet and forming a continuation of the mixing chamber 24 is a discharge nozzle 27 adapted to deliver material to a pair of cooperative rolls 28 and 29, hereinafter referred to as the initial forming rolls. The rolls 28 and 29, as shown in FIG. 2, operationally connected by gears 30 and 31 so as to revolve in opposite directions and are driven via sprockets 32 and 33 and a chain 34 by a suitable gear motor 35. The roll 28 is peripherally grooved in any desired pattern 36, illustrated as a diagonal lattice, while the second roll 29 in the embodiment shown has a plain and preferably polished surface. The axial distance of the two rolls may be adjusted to establish a very narrow clearance between their peripheries, or may be urged firmly one against the other for the purposes hereinafter set forth. The discharge nozzle 27, also as shown in FIG. 2, is narrow and vertically tapered with its outlet opening being in the form of a narrow slot spanning a substantial lateral zone between the rolls 28 and 29.

The operations by which the initial forming of the product is accomplished are as follows:

A strong plastic solution 37, typically of nylon dissolved in isopropanol, methyl or ethyl alcohol, is provided in the reservoir 22. For color effects if desired, a suitable solvent dye may be employed. The pump 20 delivers the solution via the pipe 23 to the mixing chamber 24. The discharge end of the pipe 23, as shown in FIG. 3, is provided with a perforated plate 38 which places a measure of back pressure on the pump and by uniform, forcible, multiple discharge through the perforations, assures uniformly distributed flow within the bore of the chamber. A non-solvent liquid, in the present case water, is forced at high pressure through the mixing nozzle 25 from which it emerges at high speed as a finely divided spray 39. The spray mixes uniformly with the onflowing solution 37 to form a soft fibrous mass 37a. This mass, propelled by the combined forces of the pump and the spray 39, is forced through the discharge nozzle 27 and is delivered thereby in a wide band to the rolls 28 and 29.

The inward rotation of the rolls carries the material between them, so that it emerges as a web 40 with surfaces formed in correspondence with the molding contours of the respective rolls. During this process the rolls also act as a wringer to expel a portion of the previously injected water and thus toughen the emerging web. In the present illustration, as shown in greatly enlarged detail in FIG. 5, the die roll 28 has produced a conformation of interconnecting ribs 41 defining the desired mesh or lattice pattern shown in FIG. 4. With the rollers 28 and 29 in contact, a thin base film such as the film 42 may be formed in isolated parts or even throughout the entire bottom surface of the web 40. If desired a heavier film 42 may be formed by providing a peripheral clearance between the rolls 28 and 29. In the latter case the film extends throughout the area of the web and is effective as a reinforcement in maintaining the accuracy of the lattice pattern during the stripping of the web 40 from the rolls and its progress to the next processing step.

Referring again to FIG. 1, upon its emergence from the rolls 28 and 29 the web 40 is led to a stripper roller 43. Air jets 44 and 45, directed angularly toward the zone of emergence on opposite faces of the web 40, assist the stripping of the web from the rolls and at the same time afford a further degree of toughening to the web by evaporation of liquid. From the roller 43 the web is conveyed first to a solvent bath 46, thence to a washing bath 47, thence to a curing chamber 48, and finally to any desired receiving means such as a take-up reel 49. Successive belt conveyors 50, 51, 52, 53, 54, 55 and 56 support the web 40 throughout its progress, the belts being preferably of porous or mesh construction to allow free access of the processing fluids to the bottom of the web. It will be understood that the various operational elements are all driven in proper synchronism by any suitable means, for example by connection to the roll motor 35, but as such driving and power transmitting means are well known in the art they are not shown in the drawings in order to simplify the showing of the invention per se. It will also be understood, of course, that in setting up for a run the apparatus may be operated at slow speed or intermittenly to permit initial "threading" of the web.

As noted above, after leaving the stripper roller 43 the web 40 enters the bath 46, which in the present example contains alcohol, a solvent for nylon. The alcohol attacks the surfaces of the web to dissolve material therefrom. This action reduces the cross-sectional areas of the ribs 41 by a relatively small amount in the type of product illustrated, but the base film 42, being very thin, is dissolved entirely, so that the web is converted to the true open-work or mesh form shown in FIGS. 4 and 6. As the meshed web 40 emerges from the bath 46 on the conveyor 52 the blast from an air blower 57 removes the greater part of the excess alcohol, after which the web is washed with water in the bath 47 and finally heat cured in the curing chamber 48.

From the foregoing descripiton it will be evident that the forming of the product is accomplished by a dual process, namely by first establishing the desired pattern mechanically and secondly by treating the pattern to insure removal of all films. It will further be evident that the process is readily adaptable to a wide variety of patterns and web thicknesses. An example of flexibility and consequent advantage of the dual process appears in case it is desired to produce a very thin and fine-threaded product such as net or lace. If desired the proportions and/or speed of the apparatus may be so adjusted as to retain the web 40 in the solvent bath 46 for a time substantially longer than that necessary to dissolve the base film 42, thus permitting the solvent to reduce the ribs or threads of the mesh and obtain a higher degree of fineness while still maintaining the threads in their original patterned relationship.

The form of the invention illustrated in FIGS. 7, 8, 9, and 10 is substantially the same as that described except for the interposition of means to form embossed shapes such as brassiere cups from the moving web. For this purpose the web 40, instead of pasing directly from the stripper roller 43 to the solvent bath 46, is led between an upper set of successive forming rolls 58a, b, c, d, e, and a matching lower set 59a, b, c, d, e. In the enlarged views in FIGS. 8, 9 and 10, in order to simplify the showing of the embossing operation the web 40 is represented as of uniform thickness except for the token conformations 40a shown leaving the die roll 28 in FIG. 8, but it will be understood that in practice the web throughout carries the pattern imparted thereto in the manner previously described.

Referring to FIG. 8, it will be seen that the typical upper rolls 58a and 58b are constructed with embossing lobes 60a and 60b respectively, matching cavities 61a and 61b being provided in the lower rolls 59a and 59b. A wide belt 62, preferably of thin flexible metal such as stainless steel, peripherally engages all the rolls of the upper set, being provided with apertures 63 to afford ample clearance for the embossing lobes to protrude therethrough. The outer borders of the belt are perforated to engage sprocket teeth 64 on the peripheries of the various rolls, thus assuring proper registration of the apertures 63 with the embossing lobes. The lower rolls 59a, etc., carry a similar belt 65 similarly sprocketed to these rolls and having apertures 66 providing clearance throughout the embossing areas. As previously explained with respect to FIG. 1, the various rolls of the embossing or secondary shaping sub-assembly are operationally connected by well-known power transmitting means so as to function in proper synchronism with each other and with the other elements of the processing apparatus.

In operation, the web 40 is fed through the secondary shaping unit between the upper and lower belts 62 and 65, the successive pairs of rolls 58a and 59a, etc., operating as embossing dies to form embossments or cups 67 in the web, as shown in FIG. 8. In the case of relatively deep embossments the successive pairs of rolls may be so proportioned as to produce the desired form in a series of successively deepening steps somewhat analogous to those employed in the deep drawing of metals, thereby preventing undue stress on the relatively fragile web 40 during any single forming engagement. To illustrate this provision, it will be noted in FIG. 8 that the initial depression of cups 67 effected by the rolls 58a and 59a is relatively shallow but is deepened in the passage between rolls 58b and 59b. While the graduated deepening provision may be distributed throughout the entire embossing sub-assembly, in practice it is normally advantageous to complete the final forming by the earlier portion of the roll series and to employ the remaining rolls to retain and further "set" the final form of the embossment. For example, in the sub-assembly shown in FIG. 7 the first three upper rolls 58a, 58b and 58c, together with their respective lower rolls, may be proportioned to effect the shaping step by step to the desired final depth, while the remaining two pairs of rolls 58d, etc., may be substantially duplicates of the pair 58c—59c and thus adapted to operate as setting dies as noted.

From the embossing or secondary shaping sub-assembly the web 40 is conveyed through the solvent bath 46, the washing bath 47, and the curing chamber 48 in the manner previously described. However, in the case of the embossed web the supporting conveyors are so constructed as to provide clearance for the embossments 67, for example by the use of spaced tapes 68 running on recessed pulleys 69 as illustrated in FIG. 10. Similar provision is made in cases wherein the secondary shaping sub-assembly is designed to produce three-dimensional shapes of partly open configuration, such as brassiere half cups or the like.

The foregoing description has made use of specific examples to explain the invention most cogently, but it will be realized by those skilled in the art that the process and apparatus are adapted to numerous variations while still operating in the same fundamental manner. For instance, while the typical combination cites nylon as the plastic, alcohol as the solvent, and water as the congealing medium and washing agent, other plastics may be processed with suitable solvent and non-solvent fluids in the manner described; similarly, the die pattern of the initial forming rolls, the number and contours of the secondary shaping rolls, etc., may readily be varied to meet the requirements of a particular end product desired. Thus, while the invention has been set forth in preferred explanatory form it is not limited to the precise embodiments illustrated, as various modifications may be made without departing from the spirit of the invention within the scope of the appended claims.

What is claimed is:

1. The process of manufacturing an open mesh from a plastic material comprising the steps of forming a solution of said plastic material, intimately mixing a non-solvent fluid with said solution to cause the plastic material to form a soft mass, mechanically forming said mass under pressure into a web having a predetermined pattern of interconnected ribs and then curing said formed web.

2. That process of manufacturing an open mesh from a plastic material, which includes the steps of establishing a solution of said plastic material, intimately mixing a non-solvent fluid with said solution to create a soft fibrous mass, mechanically forming said mass into a web having a pre-determined pattern of interconnected ribs, subjecting said web to a solvent fluid, washing said web to remove said solvent fluid, and curing said washed web.

3. That process of manufacturing an open mesh from a plastic material, which includes the steps of establishing a solution of said plastic material, intimately mixing a non-solvent fluid with said solution to create a soft mass including said plastic, mechanically forming said mass into a web having a pre-determined pattern of interconnected ribs and a closing base film formation while ejecting a portion of said non-solvent fluid, conducting said formed web through a volume of solvent fluid for dissolving said base film formation, whereby said web may be converted to open meshed form while retaining said ribs in said pattern, and curing said meshed web.

4. That process of forming a mesh from a plastic material, which includes the steps of establishing a solution of said material, establishing a flow of said solution, injecting a non-solvent fluid into said flowing solution to create a soft moving mass, mechanically wringing a portion of said non-solvent fluid from said moving mass while rolling said mass to a web having a pattern of interconnected ribs and a base film formation spanning said pattern, and dissolving said film formation from said web.

5. That process of manufacturing a thin mesh from a plastic material, which includes the steps of establishing a solution of said material, establishing a flow of said solution, injecting a non-solvent fluid into said flowing solution to create a soft moving mass, mechanically wringing a portion of said non-solvent fluid from said moving mass while reducing said mass to a web having a pattern of interconnected ribs and a film formation spanning said pattern, subjecting said web to a solvent fluid for a time period adapted to permit said solvent fluid to dissolve said film formation and to substantially reduce the cross-sectional areas of said ribs, and curing said web.

6. That process of manufacturing an open mesh from nylon plastic, which includes the steps of establishing an alcoholic solution of said plastic, intimately mixing water with said solution to congeal the plastic, mechanically forming said congealed plastic under pressure into a web having a pre-determined pattern of interconnected ribs and then thermally curing said web.

7. That process of manufacturing an open mesh from nylon plastic, which includes the steps of establishing an alcoholic solution of said plastic, intimately mixing water with said solution to create a congealed mass of said plastic, mechanically forming said mass into a web having a pre-determined pattern of interconnected ribs and a closing base film formation while ejecting a portion of said water for toughening said formed web, conducting said web through an alcoholic bath for dissolving said film formation, whereby said web may be converted to open meshed form while retaining said ribs in said pattern, and thermally curing said meshed web.

8. That process of forming an open mesh from nylon plastic, which includes the steps of establishing a solution of said plastic, establishing a flow of said solution, injecting water into said flowing solution in the direction of said flow to create a moving fibrous mass, mechanically wringing a portion of said water from said moving mass while rolling said mass to a web having a pre-determined pattern of interconnected ribs and a reinforcing film formation spanning said pattern, and alcoholically dissolving said film formation while supporting said ribs in said pattern.

9. That process of manufacturing a thin mesh from nylon plastic, which includes the steps of establishing an alcoholic solution of said plastic, establishing a flow of said solution, forcibly injecting water into said flowing solution in intimate mixing relation to create a moving soft fibrous mass, mechanically wringing a portion of said water from said mass while reducing said mass to a web having a pre-determined pattern of interconnected ribs and a reinforcing film formation spanning said pattern, subjecting said web to an alcoholic solvent throughout a time period adapted to permit said solvent to dissolve said film formation and to substantially reduce the cross-sectional areas of said ribs, washing said web, and thermally curing said washed web.

10. A process according to claim 8 which includes applying jets of air to the surfaces of said web intermediate said initial formation thereof and said application of said solvent.

11. In apparatus for manufacturing an open mesh from a plastic material, in combination, a source of a solution of said material, means forming a mixing chamber having an outlet, means to force said solution from said source through said chamber, means including a mixing nozzle within said chamber adapted to inject a fluid into said solution for creating a soft fibrous mass, a pair of cooperative forming rolls having conformations adapted to form a web having a pre-determined pattern of interconnected ribs, means to drive said rolls, a spreading nozzle connected to said outlet of said mixing chamber and adapted to deliver said mass to said rolls whereby said rolls may convert said mass to said web, means to strip said web from said rolls, and means to cure said meshed web.

12. Apparatus according to claim 11 wherein said stripping means includes means to direct jets of air angularly against the faces of said web in the zone of emergence of said web from said rolls.

13. In apparatus for manufacturing a mesh product from a plastic material, in combination, a source of a solution of said material, means forming a mixing chamber having an outlet, means to force said solution from said source through said chamber, means including a mixing nozzle within said chamber adapted to inject a fluid into said solution for creating a soft congealed mass, a pair of cooperative forming rolls having conformations adapted to form a web having a pattern of interconnected ribs and a closing film formation between at least some of said ribs, means to drive said rolls, a spreading nozzle connected to said outlet of said mixing chamber and adapted to deliver said mass to said rolls whereby said rolls may convert said mass to said web, means to strip said web from said rolls, secondary forming means to form three-dimensional shapes from areas of said stripped web, a solvent bath, means to conduct said web including said shapes through said bath to dissolve any films that may be formed and means to cure said meshed web.

14. In apparatus for manufacturing a mesh product from a plastic material, in combination, a die roll having a peripheral pattern of interconnected grooves, a second roll of plain exterior surface, said second roll being disposed axially parallel to said first roll in closely spaced peripheral relation therewith, means to drive said rolls in cooperatively opposite rotational directions, means to establish a soft congealed plastic mass, and means to feed said mass to said rotating rolls whereby said rolls may reduce said congealed mass to a web having ribs correspondent to said peripheral die grooves.

15. In apparatus for manufacturing a mesh product from a plastic material, in combination, primary forming means including a die roll having a peripheral pattern of interconnected grooves and a second roll of plain exterior surface, said second roll being disposed axially parallel to said first roll in closely spaced peripheral relation therewith, means to drive said rolls in cooperatively opposite rotational directions, means to establish a soft fibrous plastic mass, means to feed said mass to said rotating rolls whereby said rolls may reduce said mass to a web having ribs correspondent to said peripheral die grooves, means to strip said web from said rolls, secondary forming means adapted to engage said stripped web to form three-dimensional shapes from areas thereof, and means for curing said shapes.

16. Apparatus according to claim 14 wherein said secondary forming means includes a plurality of successive pairs of cooperative forming members.

17. Apparatus according to claim 14 wherein said secondary forming means includes a plurality of successive pairs of cooperative forming rolls so proportionally related as to effect said secondary forming in a plurality of successively deepening steps.

18. In apparatus for producing a web from plastic material, in combination, a pair of closely spaced rolls, means to drive said rolls in cooperative relation, means to establish a soft cold plastic mass including said plastic material and a non-solvent fluid, means to feed said mass to said rolls whereby said rolls may reduce said mass to a web while wringing a portion of said non-solvent fluid therefrom, and means to strip said web from said rollers.

References Cited in the file of this patent

UNITED STATES PATENTS

| | | |
|---|---|---|
| 280,094 | Suter | June 26, 1883 |
| 525,738 | Hauser | Sept. 11, 1894 |
| 934,214 | Ratignier et al. | Sept. 14, 1909 |
| 2,351,208 | Herrmann et al. | June 13, 1944 |
| 2,624,913 | Montross et al. | Jan. 13, 1953 |
| 2,638,628 | Stott et al. | May 19, 1953 |
| 2,783,894 | Lovell et al. | Mar. 5, 1957 |
| 2,949,639 | Woodward | Aug. 23, 1960 |
| 2,957,200 | Pufahl et al. | Oct. 25, 1960 |
| 3,051,995 | Ferrell et al. | Sept. 4, 1962 |